United States Patent
Ries et al.

[11] Patent Number: 6,161,879
[45] Date of Patent: Dec. 19, 2000

[54] TWO-COMPONENT CONNECTOR

[75] Inventors: Hans Ries, Marl; Frank Lorenz, Olfen; Guido Schmitz, Dorsten, all of Germany

[73] Assignee: Huels Aktiengesellschaft, Marl, Germany

[21] Appl. No.: 08/948,422

[22] Filed: Oct. 10, 1997

[30] Foreign Application Priority Data

Oct. 10, 1996 [DE] Germany .................. 196 41 751

[51] Int. Cl.⁷ .................................................. F16L 25/00
[52] U.S. Cl. ...................... 285/330; 285/292; 138/109; 156/296; 264/328.1
[58] Field of Search ................... 285/292.1, 290.5, 285/286.1, 330, 925, 908, 914, 49, 331, 239; 138/109; 156/296; 264/328.1

[56] References Cited

U.S. PATENT DOCUMENTS

| | | | |
|---|---|---|---|
| 497,915 | 5/1893 | Fulghum et al. | 403/294 |
| 798,196 | 8/1905 | Lyle | 285/330 |
| 2,109,078 | 2/1938 | Washo | 285/286.1 X |
| 2,246,404 | 6/1941 | Ross | 285/293.1 X |
| 3,334,650 | 8/1967 | Lowrey et al. | |
| 3,519,289 | 7/1970 | Haffer | 285/49 |
| 3,692,335 | 9/1972 | Vickers et al. | 285/49 |
| 3,936,078 | 2/1976 | Wallyn | 285/330 |
| 4,626,005 | 12/1986 | Stifter | 285/239 |
| 5,058,932 | 10/1991 | Mackal | 285/330 X |
| 5,058,933 | 10/1991 | Mackal | 285/330 X |
| 5,085,472 | 2/1992 | Guest | 285/331 |
| 5,143,407 | 9/1992 | Cokeh | 285/331 |
| 5,443,098 | 8/1995 | Kertesz . | |

FOREIGN PATENT DOCUMENTS

| | | | |
|---|---|---|---|
| 220652 | 8/1958 | Australia | 403/294 |
| 1130844 | 2/1957 | France | 285/330 |
| 42 39 909 | 5/1994 | Germany . | |
| 195 35 413 C1 | 10/1996 | Germany . | |
| 272685 | 3/1992 | Japan | 285/331 |
| 67082 | 11/1943 | Norway | 285/331 |
| 675902 | 11/1990 | Switzerland | 285/331 |

*Primary Examiner*—Dave W. Arola
*Attorney, Agent, or Firm*—Oblon, Spivak, McClelland, Maier & Neustadt, P.C.

[57] ABSTRACT

A connector for connecting an assembly to a pipe, which is highly leakproof with respect to the medium to be transported and is secure against separation under axial load. The connector comprises two materials A and B which swell to different degrees. A part comprising the more strongly swelling material A has, at the junction with the material B, a peripheral connecting lip which is substantially enclosed by the less swelling material B, so that a positive connection is achieved.

22 Claims, 1 Drawing Sheet

TWO-COMPONENT CONNECTOR

BACKGROUND OF THE INVENTION

1. Field of the Invention

The present invention relates to a pipe-like component for connecting pipes to other assemblies, for example for connecting fuel lines to other components of the fuel supply system, such as the tank.

2. Discussion of the Background

In the context of the ever-stricter demands for reducing hydrocarbon emissions from vehicles, improving the performance of connectors is becoming increasingly important. The connection of fuel lines to a plastic fuel tank, for example, proves especially problematic, since the incompatibility of the different materials means that the lines must be connected by means of welded-on polyethylene (PE) nipples. This material, however, has a high creep tendency, so that conventionally constructed connections between pipe and nipple, for example using quick-action couplings, fail because within a short period of time they begin to leak due to creeping of the PE.

This can, of course, be avoided by using elastomer pipes. In this case, however, the rubber pipes themselves are the weak point, since they are substantially permeable to hydrocarbons. While fluoroelastomers have better barrier properties, they are extremely expensive. Connecting the PE nipples by means of rubber tubing onto a non-creeping connector, for example made from glass-fiber-reinforced nylon, is also complex in production and expensive. Furthermore, the tubing is still an undesirable source of emissions.

Direct connection, for example between a PE nipple and a nylon pipe fitted over it, likewise fails after a short period of time since the prestressing of the pipe causes the PE to creep, so that, on the one hand, the connection begins to leak, and, on the other hand, the joint strength under axial loading becomes unacceptably low.

Elevated temperatures in the region of the connection and the swelling caused by the fuel components make the creation of a low-permeability connection still more difficult.

Construction of a low-creep nipple is unsuccessful. First, because no suitable reinforced varieties of PE, adequate for the mechanical demands on the connection, are available and, second, the strength of a welded joint between a fiber-filled polymer and an unfilled polymer is not sufficiently high.

German Patent 42 39 909 discloses a connection intended to solve these problems. A pipe-like connector of a material A having a tendency to creep is encapsulated on one side with a second material, B, having a low creep tendency. In the contact area between the two materials, this pipe-like structure has, therefore, a layered construction AB. This connection technique has, however, not proved successful in practical trials. In contact with fuel, the material A swells strongly. Since the swelling on one side is restricted by the material B, the material swells and creeps in the other directions so that, after some time, the load transmission and the tightness of the connection are no longer ensured. This phenomenon is further amplified under mechanical load and/or on drying out of this pipe-like connector. Even modifying one of the two materials in order to achieve adhesion between the materials leads to a deterioration in leak-tightness because the modified material (generally PE) swells still more strongly.

Accordingly, there remains a need for connectors which overcome these problems.

SUMMARY OF THE INVENTION

An object of the present invention is to provide a connector which takes advantage of the differential swellability of the component materials, by means of an appropriate geometric design of the interface between the materials, to produce a secure connection between two objects and reduce polluting emissions.

This object may be accomplished with connector comprising two materials A and B which swell to different extents. A part comprising the more strongly swelling material A has, at the junction with a second part comprising material B, a peripheral connecting lip which is substantially enclosed by the less strongly swelling material B, so that a positive connection is achieved.

BRIEF DESCRIPTION OF THE DRAWINGS

In FIG. 1, the cross-section of the connecting lip 3 giving rise to the positive connection is lozenge-shaped, in FIG. 2 double-lozenge-shaped, in FIG. 3 oval or circular, in FIG. 4 double-oval or double-circle and in FIG. 5 an asymmetrical combination of the shapes in FIG. 1 and FIG. 3.

DETAILED DESCRIPTION OF THE INVENTION

A more complete appreciation of the invention and many of the attendant advantages thereof will be readily obtained as the same becomes better understood by reference to the following detailed description.

The connector of the present invention is made of two connected parts. The first part comprises material A. The second part comprises material B. The first part has a peripheral connecting lip at one end, which, at the junction, i.e., connection point, with the second part is substantially enclosed by material B of the second part. Thus, the first and second parts are connected by one end of the second part substantially enclosing the connecting lip of the first part. As used herein, the term "substantially enclosing" means that the connecting lip of the first part is enclosed by the second part to the extent that a strong positive connection is achieved between the first and second parts without any substantial undesirable creeping of the first part due to swelling. The term "substantially enclosing" also means that materials A and B are connected at the interface such as to keep emissions from the connector acceptably low. Preferably, the connecting lip made of material A is completely enclosed by the material B.

Material A is more swellable as compared to material B. As used herein, the term "more swellable" means that material A swells more than material B in the presence of the liquids which flow through the connector during use, such as fuel components (e.g., hydrocarbons and oils), at ambient and elevated temperatures. Therefore, when the present connector is contacted with, for example, a fuel, material A swells and the swelling is retarded by the less-swellable material B. This interaction between A and B forms a tight seal between materials A and B, i.e., between the first and second parts of the present connector. The axial forces arising both during swelling and also during drying-out of the swelling material (A) create a sealing effect at the outer side or at the inner side of the connecting lip.

The peripheral connecting lip is important for ensuring a good connection between materials A and B. As shown in the Figures, the connecting lip may have a variety of shapes. When the connecting lip has a lozenge-shaped cross-section, the boundaries in the intermeshing areas and the corners of the lozenge shapes are preferably designed with a slight rounding in order to avoid unacceptably high notch stresses.

Figure 1:
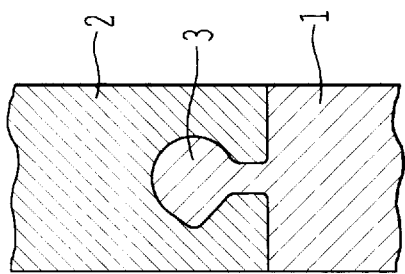
In FIGS. 1 to 5, the cross-sections of representative connecting lips 3 are shown connecting material A 1 and material B 2. The cross-sections can be symmetrical (FIGS. 1 to 4) or asymmetrical (FIG. 5), and can be built up from one basic shape (FIGS. 2, 3 and 5) or from two or more basic shapes (FIGS. 1 and 4).
Figure 2:
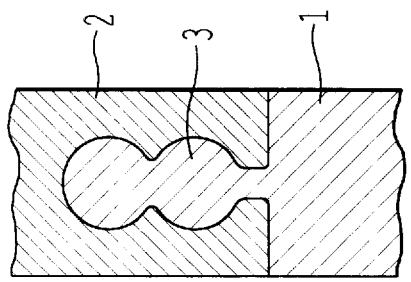
Figure 3:
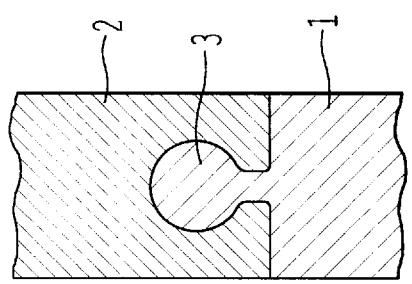
Figure 4:
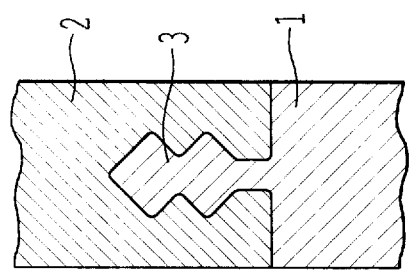
Figure 5:
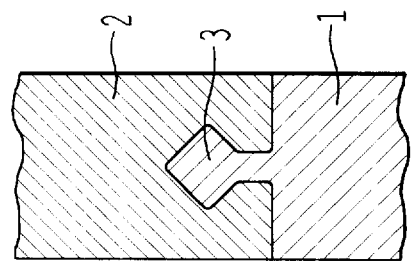
Figure 6:
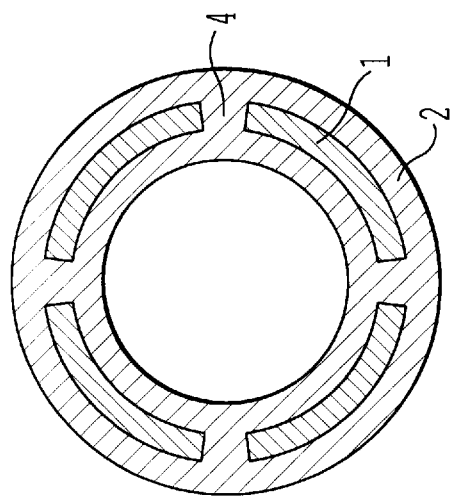
FIG. 6 shows, seen from above, a section through a representative embodiment of the pipe-like connector. In this case, the connecting lip of material A 1, enclosed by material B 2, is divided at 4 points into segments by channels running in the axial direction, with material B 2 present at the break points 4.

As shown in FIG. 6, the connecting lip may be divided into segments by channels running in the axial direction. Material B is present at the break points. This design prevents twisting of the two components A and B with respect to each other. The number of break points is not particularly limited. The connecting lip may have from 2 up to 20 break points. The depth of the channels may be smaller than or the same as the thickness of the lip wall.

One or more holes running in the radial direction through the wall of the more strongly swelling component may also be used to achieve a positive connection and thereby prevent twisting and/or separation under axial load. This measure is preferably combined with a shape of the connecting lip which also works in this direction, shown in the examples in FIGS. 1 to 5. The depth of the holes can be less than or the same as the thickness of the lip wall.

Material A may be a thermoplastic or an elastomer. A preferred thermoplastic, is polyethylene. High density polyethylene (HDPE) is particularly preferred. The first part of the connector preferably consists essentially of material A.

Material B may be a thermoplastic or a metal. Suitable examples of thermoplastics which may be used as material B include polyamides (such as nylons), polyketones and polyacetals. The metals are preferably compatible with fuels (such as hydrocarbons and oils, especially gasoline). Suitable examples of metals which may be used as material B include copper, iron, nickel and mixtures thereof, such as steels (e.g., carbon steels, carbon-molybdenum steels, chromium-molybdenum steels and chromium-nickel steels). Mixtures of these materials may be used. The second part of the present connector which contains material B may additionally contain a fiber-reinforced molding compound. Suitable examples of the reinforcement include glass fibers, carbon fibers, aramid fibers and metal fibers. In a preferred embodiment, material B comprises a metal. This component can, for example, be screwed onto an assembly by means of a thread or a flange. The second part of the connector preferably consists essentially of material B.

The two materials A and B may be incompatible with each other at the molecular level, i.e., no adhesion of the phases is achieved at the interface between the two materials. In this embodiment, the prevention of separation under axial load is achieved solely by means of the positive connection between A and B, as discussed above. Better prevention of separation and a more dependable sealing effect may be achieved, however, if the two materials A and B are compatible with each other. This is achieved if the two materials are compatible with each other at the molecular level or if they are bonded to each other by means of chemical reaction at the phase interface. In fuel supply systems, material A is, for example PE, in particular HDPE, and material B is, for example, nylon 12 or another nylon such as nylon 11, nylon 6, nylon 66, nylon 612, or a polyketone or a polyacetal. The compatibilization of these polymers may be accomplished by, for example, using an HDPE which has been functionalized according well-known methods with, for example, maleic anhydride, so that encapsulation gives chemical bonding at the interface between PE and the nylon. It is also possible to use adhesion promoters which are well-known to those of ordinary skill in the art. Preferably, at least one of material A or B is adhesion modified.

In a preferred embodiment, the first part of the present connector (comprising material A) has a first end which terminates with the peripheral connecting lip. The second end of the first part may be connected to another object, as described above. The second part of the connector (comprising material B) has a first end which substantially encloses the peripheral lip of the first end of the first part. In other words, the first end of the second part contacts the first end of the first part by enclosing the connecting lip. The second end of the second part may be connected to another object, as described above. The second part is preferably an elongated tubular portion.

The novel connector may be produced in a simple manner by two-component injection molding, either by injecting molding component B melt onto a molding made from component A, or, conversely, by injecting molding component A melt onto a molding made from component B. Another production method is either injecting component B and then injecting component A into the melt of component B, or, conversely, injecting component A and then injecting component B into the melt of component A. All of these two-component injection molding processes are well-known to those of ordinary skill in the art.

The novel connector may be used in all cases where the technology of the connection requires material A for connection to an assembly while material B is required for connection to a pipe. The connector can, for example, be used as connector piece between a tank, in particular a plastic fuel tank, and a pipe, by welding the connector, for example, by spin welding, onto a port in the plastic fuel container.

The novel connector can be connected at the other side, that is toward the pipe, using any of the well-known methods. For example, connection of the pipe can be carried out by fitting the pipe over a spigot. Other possibilities are connection using a quick-action coupling, by means of welding or by screwing. Connectors for connecting valves, filters, or other components in systems which carry any type of liquids or vapors are also within the scope of the present invention.

Use of the novel connector thus achieves a permanently secure connection between module and pipe, and at the same time a reduces polluting emissions.

Obviously, numerous modifications and variations of the present invention are possible in light of the above teachings. It is therefore to be understood that within the scope of the appended claims, the invention may be practiced otherwise than as specifically described herein.

The present application is based on German patent application No. 196 41 751.1, filed Oct. 10, 1996 and incorporated herein by reference in its entirety.

What is claimed as new and desired to be secured by letters patent of the United States is:

1. A connector, comprising:
   a first part, wherein said firs part comprises material A and has a first end having a peripheral connecting lip, and
   a second part, wherein said second part comprises material B and has a first end which substantially encloses said peripheral connecting lip,
   wherein said material A is more swellable than said material B,
   wherein said first part and said second part are made by two-component injection molding, and
   wherein material B is melted onto a molding made from material A.

2. The connector of claim 1, wherein said first end of said second part completely encloses said peripheral connecting lip.

3. The connector of claim 1, wherein said material A is a thermoplastic or an elastomer and said material B is a thermoplastic or a metal.

4. The connector of claim 1, wherein said material A is polyethylene.

5. The connector of claim 1, wherein said material B is a polyamide, polyketone or polyacetal.

6. The connector of claim 1, wherein said peripheral connecting lip comprises at least one channel running in the axial direction.

7. The connector of claim 1, wherein said peripheral connecting lip comprises one or more holes running in the radial direction.

8. The connector of claim 1, wherein said material A and said material B are compatible with each other.

9. The connector of claim 1, wherein at least one of said material A or said material B is adhesion modified.

10. The connector of claim 1, wherein said second part is an elongated tubular portion.

11. The connector of claim 1, wherein the first part and said second part are made by two-stage injection molding.

12. The connector of claim 1 joined to an assembly and a pipe.

13. The connector of claim 12, wherein said assembly is a tank, a valve or a filter.

14. The connector of claim 12, wherein said assembly is a plastic fuel tank.

15. The connector of claim 12, wherein said pipe comprises an automobile fuel line.

16. The connector of claim 12, wherein said first part has a second end connected to said assembly, and said second part has a second end connected to said pipe.

17. The connector of claim 1, further comprising a bonding agent connecting the first part and the second part.

18. The connector of claim 1, wherein said peripheral connecting lip includes a portion having a lozenge-shaped cross-section.

19. The connector of claim 1, wherein said peripheral connecting lip includes a portion having a rounded cross-section.

20. A connector comprising:
    a first part, wherein said first part comprises material A and has a first end having a peripheral connecting lip, and
    a second part, wherein said second part comprises material B and has a first end which substantially encloses said peripheral connecting lip,
    wherein said material A is more swellable than said material B,
    wherein said fist part and said second part are made by two component injection molding, and
    wherein material A is melted onto a molding made from material B.

21. A connector comprising:
    a first, wherein said first part comprises material A and has a first end having a peripheral connecting lip, and
    a second part, wherein said second part comprises material B and has a first end which substantially encloses said peripheral connecting lip,
    wherein said material A is more swellable than said material B,
    wherein said first part and said second part are made by two-component injection molding, and
    wherein material B is injected and then component A is injected into the melt of component B.

22. A connector comprising:
    a first part, wherein said first part comprises A and has a first end having a peripheral connecting lip, and
    a second part, wherein said second part comprises material B and bias a first end which substantially encloses said peripheral connecting lip,
    wherein said material A is more swellable than said material B,
    wherein said first part and said second part are made by two-component injection molding, and
    wherein material A is injected and then component is injected into the melt of component A.

* * * * *